United States Patent Office 2,774,150
Patented Dec. 18, 1956

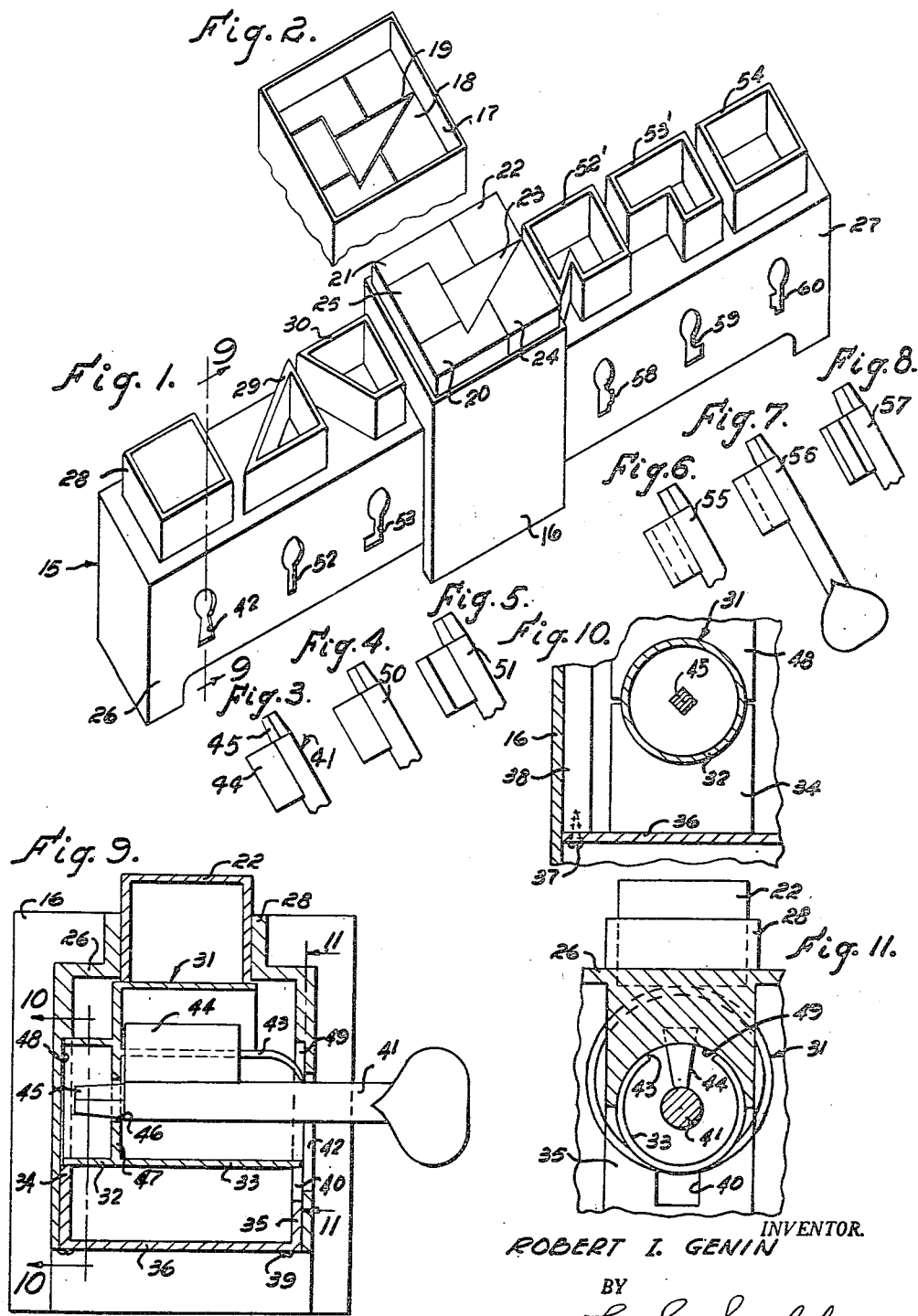

2,774,150

EDUCATIONAL TOY

Robert I. Genin, Hollis, N. Y.

Application May 19, 1955, Serial No. 509,634

9 Claims. (Cl. 35—22)

This invention relates to an educational toy.

It is a principal object of the invention to provide an educational toy for use by children that involves the principle of fitting blocks of different shape into their respective openings provided in a stand and into cooperation with key-operated cams so that the blocks will simulate a lock latch and wherein the stand has key openings adapted to respectively receive keys of different shape and which when thrust through the key openings enter the cams to turn them as the key is turned and to elevate the latches or blocks supported while in the openings upon the cams.

It is another object of the invention to provide in an educational toy that includes a plurality of blocks of different shapes adapted to fit certain respective openings on a stand, means for storing the blocks in a puzzle-like and compact manner upon the stand itself, thereby providing an extra operation for the child to put the blocks in a storage space when he has completed the operations of fitting the blocks into latch openings, fitting the keys into the latch cams whereby to add to the operations which can be effected with the toy.

It is still another object of the invention to provide an educational toy which can be formed of plastic as by molding and has no harmful coating or material that would be poisonous to the child when handled or placed in his mouth and which can be easily kept clean and sanitary.

Further objects of the invention are to provide an educational toy having the above objects in mind which is of simple construction, inexpensive to manufacture, has a minimum number of parts, is easy to assemble, durable, of hard material and not easily broken, compact, of pleasing appearance, receives the interest of the child, instructive, teaches color association to the child and improves his manual dexterity and eye-hand coordination.

For other objects and for a better understanding of the invention, reference may be had to the following detailed description taken in connection with the accompanying drawing, in which:

Figure 1 is a perspective view of the educational toy embodying the features of the present invention with the blocks in place in the storage compartment;

Fig. 2 is a fragmentary top perspective view of the block storage compartment of the toy;

Figs. 3 to 8 are respectively top views of the various keys adapted to fit the various key openings in the toy;

Fig. 9 is an enlarged vertical sectional view taken on line 9—9 of Fig. 1;

Fig. 10 is a fragmentary longitudinal sectional view taken on line 10—10 of Fig. 9;

Fig. 11 is a longitudinal fragmentary sectional view taken on line 11—11 of Fig. 9.

Referring now to the drawings, 15 generally represents the toy stand that comprises an enlarged central portion 16 having a top compartment 17 having a bottom 18 lined as indicated at 19 to identify different shape blocks 20, 21, 22, 23, 24 and 25, and wing portions 26 and 27 extending laterally from the respective opposite sides of the central portion 16. The central enlarged portion 16 and the wing portions 26 and 27 are integrally formed and of one plastic piece.

The central portion 16 and the compartment 18 thereof serve for storage of the several blocks arranged within the compartment according to the lines 19 in the bottom thereof to make for compactness and to provide a place for the blocks when the toy is to be stored or is out of use. The mere arranging of the blocks within the compartment requires manual dexterity of the child and provides an educational feature for the toy.

The wing portion 26 has raised hollow projections 28, 29 and 30 adapted to receive respectively blocks 22, 23 and 24. The child is required to select from the six blocks in the compartment 18, the particular blocks which fit these hollow projections. As the blocks are inserted into the hollow projections, they will be respectively supported on lifting cams 31, also formed of plastic, and which have end projections 32 and 33 respectively supported on ledges 34 and 35 of an elongated bottom piece 36 that serves as a bottom for the entire toy and is elongated to extend from one wing portion to the other and through the enlarged center portion 16. It is held in place by screws 37 entering corner bosses 38 in the center portion and screws 39 entering corner bosses in the ends of the wing portions and not shown. The ledges 34 and 35 are integrally formed on the bottom plate 36 and project upwardly therefrom. There are pairs of these ledges for each block opening in the wing portion 26 and in the portion 27 to be later mentioned. The ledge portion 35 is relieved at 40, Fig. 11, to accommodate a key 41 when it is inserted into a key opening 42 and into a guideway 43 extending through the projection 32 of the cam 31 and so that its side formation 44 may engage with the guideways 43 when squared end 45 enters square openings 46 in a partition 47 adjacent the projection 32 of the cam 31. If the child is finally successful in fitting the various blocks in the various hollow projections in the wing portions and in fitting the proper key in the proper opening so that it is extended into a cam, the child may lift the block from the hollow projection by means of the cam 31 by simply turning the key in the well known manner.

On the inner faces of the walls of the wing portions 26 and 27 are respectively guideways 48 and 49 serving to respectively retain the upper half of the respective axle projections 32 and 33. These guideways 48 and 49 are respectively aligned with the upstanding supporting projections 34 and 35 of the bottom plate.

A lift cam is provided under each of the hollow projections 29 and 30 and they will be similarly turned by insertion of respective keys 50 and 51 in respective openings 52 and 53. The wing portion 27 similarly has raised projections 52′, 53′, and 54 to respectively receive blocks 20, 21 and 25. Under these projections are lifting cams 31 of the same construction as has just been described and which can be actuated by the insertion of special keys 55, 56 and 57 adapted to respectively enter key openings 58, 59 and 60.

To use the toy, it will be seen that the child must fit the respective blocks taken from the central compartment 18 into the proper hollow projections on the wing portions. These blocks are of different shapes and the child must use ingenuity to properly locate the blocks and to adjust the blocks so that they readily and easily slide into the hollow projections. When the child has done this, these blocks will be supported upon the respective cams 31 which will be normally turned down and so that the key, upon being thrust through the key opening, will enter the guide opening 32 beginning in the end projection 30 and the squared end 45 enters the opening 46. The keys are of different shape and match with the various key openings in one side of the stand and the child must again use ingenuity to find the proper key opening for the particular key and to illustrate his success of turning the key and elevating the block so that it can be taken from the hollow projection. This operation of fitting the key and lifting the block is a still further educational feature.

With the blocks removed, the child can further use his ingenuity by fitting the blocks within the compartment 17 in a puzzle-like manner and on the bottom 18 in accordance with the lines 19 thereof.

The child will also have color coordination from this toy inasmuch as the blocks and the respective keys for elevating the blocks are of the same color. In other words, there are six blocks, all of different colors, and six keys, all of different colors, corresponding in color with the respective blocks.

It should now be apparent that there has been provided an educational toy which provides many educational operations for the child and something that will maintain his interest for a long period of time, and that teaches the child manual dexterity and eye-hand coordination, piece and puzzle fit and color association.

While various changes may be made in the detail construction, it shall be understood that such changes shall be within the spirit and scope of the present invention as defined by the appended claims.

What is claimed is:

1. An educational toy comprising a housing having a plurality of openings of different shape section, block elements respectively of similar shape and adapted to fit the openings, cam elements journalled in the housing under the respective openings and adapted to support and elevate said block elements when turned, said housing having a plurality of different shape key openings, said cam elements having recesses respectively aligned with the key openings and adapted to receive the key and to be engaged thereby so that a turning of the cam elements may be effected.

2. An educational toy as defined in claim 1, and said housing including a block compartment for the storage of said blocks, said compartment having a bottom therein for supporting the blocks when the blocks are arranged in a puzzle-like manner within the compartment.

3. An educational toy as defined in claim 2, and the bottom of said compartment having lines conforming to the edges of the respective blocks to give indication of the manner in which the blocks are to be fitted within the compartment.

4. An educational toy as defined in claim 1, and said housing being opened on the bottom, a bottom plate adapted to be fitted into the bottom of said housing, said plate having pairs of upstanding journal brackets for the cam elements to support the same in alignment with the key openings and means for securing said bottom plate within the bottom of the housing.

5. An educational toy as defined in claim 4, and guideway recesses on the underside of the housing corresponding to the bearing brackets of the bottom plate and receiving said cam elements to hold the cam elements against upward displacement within the housing and over the bearing brackets.

6. An educational toy comprising a housing having an opening adapted to receive a block element, a block element adapted to be fitted into said opening, said housing having a key opening, a lifting cam aligned with the key and block openings and adapted to support a block when fitted in the block opening of the housing, said lifting cam being open at the end thereof adjacent said key opening and recessed to receive said key, said cam having pivot projections and means within the housing for supporting the respective pivot projections of the lifting cam and to permit the turning thereof by the key inserted through the key opening and the recess within the lifting cam and the key inserted through the key opening and the recess in the lifting cam and having portions thereon drivingly connected to the lifting cam.

7. An educational toy as defined in claim 6, and said means for supporting the projections of the lifting cam comprising a bottom plate having upstanding bearing brackets for respectively receiving the lower sides of the projections and guideway recesses on the inner sides of the housing cooperating with the bearing brackets to hold the lifting cam against upward displacement within the housing and means for securing the bottom plate within the bottom of the housing.

8. An educational toy as defined in claim 6, and one of said bearing brackets adjacent the key opening being relieved to receive a portion of the key when inserted through the key opening.

9. An educational toy as defined in claim 6, and said key having a squared end, said cam elements having a square opening adapted to receive the squared end of said key when the key is thrust into the lifting cam.

References Cited in the file of this patent

UNITED STATES PATENTS

| | | |
|---|---|---|
| 2,377,100 | Patterson | May 29, 1945 |
| 2,416,959 | Segal | Mar. 4, 1957 |
| 2,659,163 | Albee | Nov. 17, 1953 |